United States Patent [19]

Uchida et al.

[11] 4,322,796
[45] Mar. 30, 1982

[54] REGISTER APPARATUS

[75] Inventors: Isamu Uchida; Shinya Uchida, both of Tokyo, Japan

[73] Assignee: Laurel Bank Machine Co., Ltd., Tokyo, Japan

[21] Appl. No.: 133,920

[22] Filed: Mar. 25, 1980

[30] Foreign Application Priority Data

Mar. 27, 1979 [JP] Japan .................................. 54/35979

[51] Int. Cl.³ .............................................. G06F 15/30
[52] U.S. Cl. .................................... 364/405; 364/559; 235/7 A; 235/379
[58] Field of Search ........................ 364/405, 404, 559; 235/7 A, 379; 356/71; 194/DIG. 26; 250/557

[56] References Cited

U.S. PATENT DOCUMENTS

| | | | |
|---|---|---|---|
| 3,553,437 | 1/1971 | Boothroyd | 250/219 X |
| 3,589,514 | 6/1971 | Townsend | 250/557 X |
| 3,648,020 | 3/1972 | Tateisi et al. | 194/DIG. 26 |
| 3,748,452 | 7/1973 | Ruben | 364/405 |
| 3,800,155 | 3/1974 | Potenza | 250/557 |
| 4,070,564 | 1/1978 | Tucker | 364/405 |
| 4,142,235 | 2/1979 | Tadakuma et al. | 364/405 |
| 4,159,533 | 6/1979 | Sakurai | 364/405 X |
| 4,189,774 | 2/1980 | Kashio | 364/405 |
| 4,191,999 | 3/1980 | Kashio | 364/405 |
| 4,204,765 | 5/1980 | Iannadrea et al. | 356/71 |

FOREIGN PATENT DOCUMENTS 54-144846 11/1979 Japan .................................. 364/405

*Primary Examiner*—Edward J. Wise
*Attorney, Agent, or Firm*—Fleit & Jacobson

[57] ABSTRACT

There is provided a register apparatus. The register apparatus includes a key input device for successively entering commodity prices and the amount of money received from a customer by a keying operation; a note identifying device for identifying the denomination of the note received from the customer; an arithmetic control device adapted to add said commodity prices and to calculate the sum of said amount of money entered through said key input device and the amount of money identified by said note identifying device, said arithmetic control device being further adapted to compare the sum of said commodity prices and said sum of money with each other to calculate the amount of change; a display device adapted to display said sum of said commodity price, said sum of money received from the customer and said amount of said change; and a memory device adapted to memorize said sum of said commodity price, said sum of money received from the customer and said amount of said change. The note identifying device may include a device for detecting oblique orientation of the note. The note identifying device may further include a device for detecting the pattern of the note.

4 Claims, 10 Drawing Figures

REGISTER APPARATUS

BACKGROUND OF THE INVENTION

This invention relates to a register apparatus for use in super-markets or the like.

The conventional register apparatus receives sequentially the input of a commodity price through the operation of keys and then the input of an amount of money received from customers through the operation of the same keys thereby to calculate the change. However, in this case there are instances where the amount of money received is entered after the denomination of notes received from a customer is erroneously identified, so that the customer is inconvenienced by a mistaken pay out of change, or losses are incurred by dispersement of extra change.

SUMMARY OF THE INVENTION

It is, therefore, an object of the invention is to provide a register apparatus which identifies the denomination of a note by note identifying device to enter the nominal amount and thereby obviate the above-mentioned inconveniences or losses.

According to the present invention, there is provided a register apparatus comprising; a key input device for successively entering commodity prices and the amount of money received from a customer by a keying operation; a note identifying device for identifying the denomination of the note received from the customer; an arithmetic control device adapted to add said commodity prices and to calculate the sum of said amount of money entered through said key input device and the amount of money identified by said note identifying device, said arithmetic control device being further adapted to compare the sum of said commodity prices and said sum of money with each other to calculate the amount of change; a display device adapted to display said sum of said commodity price, said sum of money received from the customer and said amount of said change; and a memory device adapted to memorize said sum of said commodity price, said sum of money received from the customer and said amount of said change.

DESCRIPTION OF THE DRAWINGS

Other objects and advantages of the present invention will become apparent from the following description made with reference to the accompanying drawings, in which.

DESCRIPTION OF THE PREFERRED EMBODIMENTS

Figures 1, 2, 3:
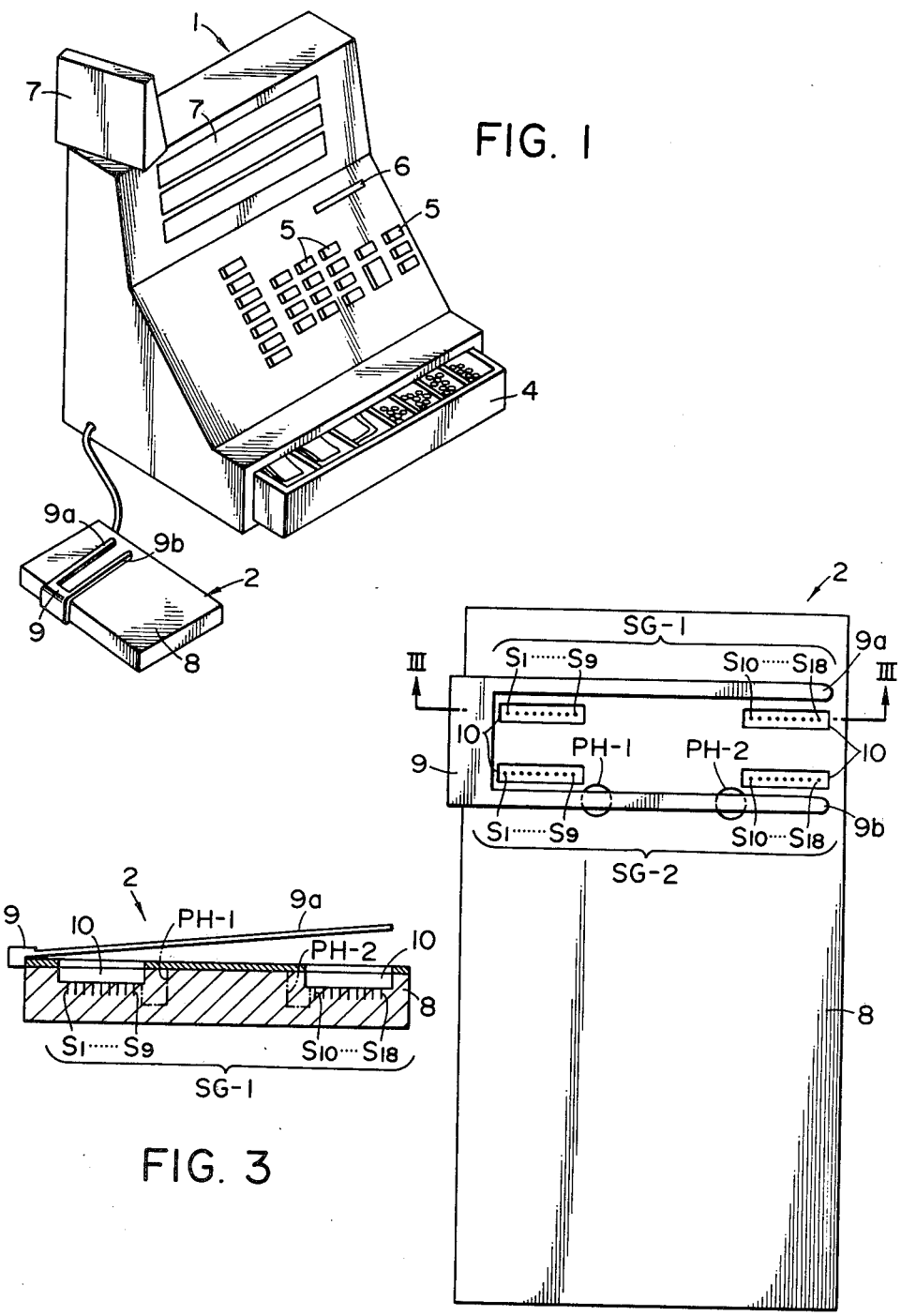
FIG. 1 is a perspective view showing a register apparatus.
FIG. 2 is a plan view of a note identifying device body.
FIG. 3 is a sectional view taken along line III—III of FIG. 2.

Embodiments of the present invention will now be described in detail with reference to the accompanying drawings.

Hereinafter will be described a first embodiment of this invention with reference to FIGS. 1 to 6.

In the drawings, reference numeral 1 designates a register apparatus body, 2 a bill identifying device body, these bodies being mounted on a base (not shown), by way of example. Since the register apparatus body 1 has substantially the same construction as those ordinarily used, it is not detailed herein. Referring to the brief description, reference numeral 4 designates a cash box received in the lower portion of the register apparatus body 1 to be drawn therefrom, 5 numeric keys, function keys, etc, and 6 a delivery port through which receipts printed by a journal printer in the register apparatus body 1 are delivered. Also on the upper portion of the register apparatus body 1 is provided a display device 7 for displaying the amount of money for goods, the amount of money received, the amount of change, etc.

The note identifying device body 2 has the construction shown in FIGS. 2 and 3. Namely, reference numeral 8 designates a rectangular base plate which has an area larger than a ten-thousand yen note. On one side of the base plate 8 is supported a holding plate 9 one end of which is capable of being opened and closed. Holding plate 9 is U-shaped and has two elongated press pieces 9a, 9b, and is adapted to be pressed against the upper surface of the base plate 8 after a note is inserted between the holding plate 9 and base plate 8. Further, the free end of this holding plate 9 may be adapted to engage the mating end of the base plate 8 by a clamp (not shown). Two sensor groups SG-1, SG-2 are provided on the upper surface of the base plate 8 between the press pieces 9a, 9b. Namely, two elongated, spaced, recessed grooves 10, 10 are formed along one press piece 9a and each recessed groove 10 receives nine sensors $S_1$–$S_9$, $S_{10}$–$S_{18}$ which constitute the first sensor group SG-1. The second sensor group SG-2 is arranged similarly to the above-mentioned along the other press piece 9b. A light source (not shown) is provided above the base plate 8 so that output signals are issued when a note interrupts light from the light source and conceals the sensors $S_1$–$S_{18}$. The base plate 8 is provided with photopattern sensors PH-1, PH-2 which detect the light and shade reflected from the note to identify the kind of note.

Figure 4:
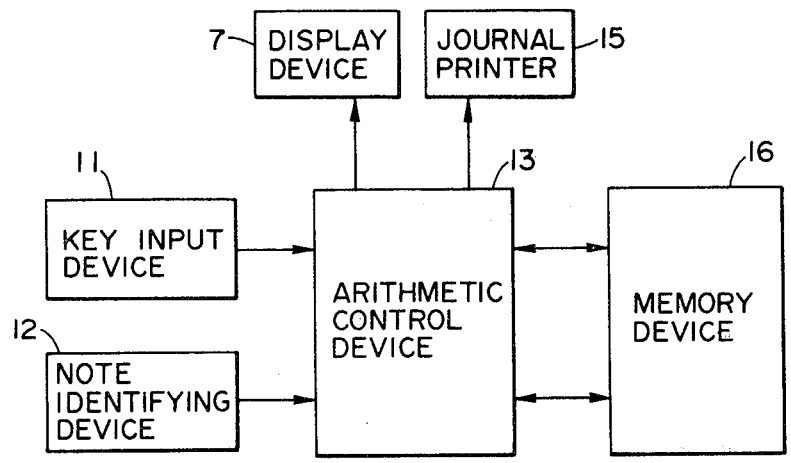
FIG. 4 is a block diagram of a register apparatus.

Next, a block diagram of an electric circuit for actuating the above-mentioned apparatus will be described with reference to FIG. 4. A key input device is designated by reference numeral 11. The amount of money for a commodity is secuentially entered by the operation of keys while a portion of the amount of money received from customers is entered by the same operation of keys. A note identifying device, designated by 12, identifies the kind of note received from customers without the operation of keys on the basis of signals from the note identifying device body 2 so that the nominal value of the note is entered as will be later detailed. An arithmetic control device, designated by reference numeral 13, carries out various calculations on the basis of information from each device 11, 12, while controlling the display device 7, journal printer 15, etc. A memory device, designated by reference numeral 16, stores temporarily the results of calculations in the arithmetic control device 13 and stores the information to be sent to the display device 7 and journal printer 15.

Figure 5:
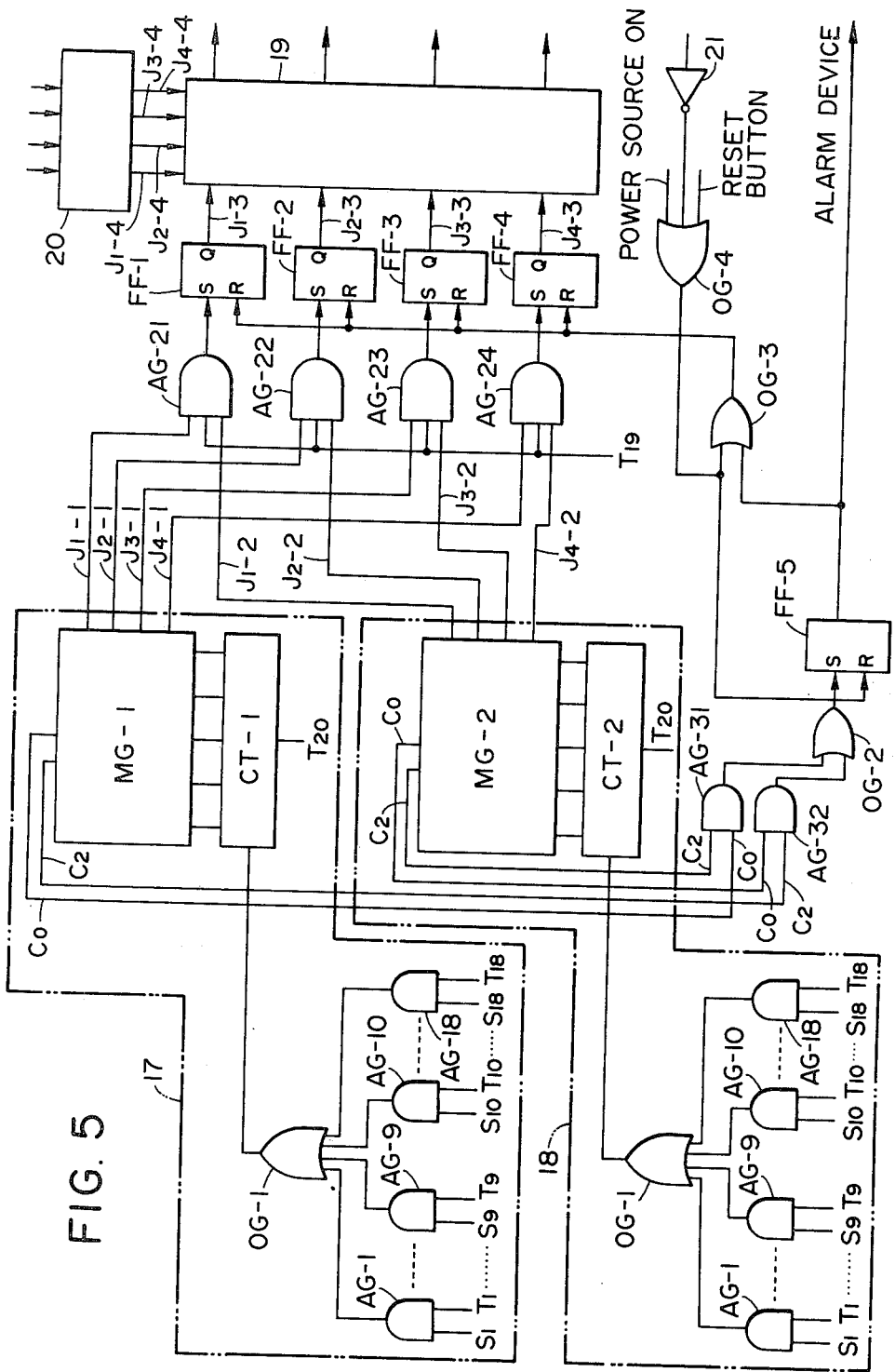
FIG. 5 is a block diagram of the note identifying device.

Next, referring to FIG. 5 showing a block diagram of the note identifying device 12, counter sections, designated by 17, 18, have the same construction, hereinafter will be described the first counter section 17. When the sensors $S_1$–$S_{18}$ of the first sensor SG-1 are concealed by a note, sensor signals $S_1$–$S_{18}$, which conform to the inserted condition of a note, are applied to AND gates AG-1 to AG-18 which correspond to the respective sensors $S_1$–$S_{18}$.

Timing signals $T_1$–$T_{18}$ from the arithmetic control device 13 are applied to these AND gates AG-1 to AG-18 sequentially at timing $T_1$–$T_{18}$. Namely, the timing signal $T_1$ is applied to AND gate AG-1 at timing $T_1$, timing signals $T_2$–$T_{17}$ are applied sequentially to AND gates AG-2 to AG-17, and finally, timing signal $T_{18}$ is applied to AND gate AG-18 at timing $T_{18}$. When binary sensor signals $S_1$–$S_{18}$ are applied at timings $T_1$–$T_{18}$ to AND gates AG-1–AG-18 as signals at logic level "1" (where the sensor signals $S_1$–$S_{18}$ from sensors $S_1$–$S_{18}$ concealed by a note are designated as logic "1" signals), the AND gates respond by delivering signal pulses, which are in synchronism with the respective timing signals $T_1$–$T_{18}$, to an octadecimal counter CT-1 through an OR gate OG-1. This counter CT-1 sends signals corresponding to the number of counted pulses to a matrix gate MG-1 constituting a decoder circuit. The matrix gate MG-1 sends signals $J_1$-1 to $J_4$-1 in response to the signals from the counter CT-1 to AND gates AG-21 to AG-24 for collation. Namely, when the matrix gate MG-1 receives a signal corresponding to the number of pulses 10–11 from the counter CT-1, it sends signal $J_1$-1 to the AND gate AG-21 and, when the same receives a signal corresponding to the number of pulses 12–13, it sends signal $J_2$-1 to the AND gate AG-22. Similarly, it sends signals $J_3$-1, $J_4$-1 respectively to AND gates AG-23 and AG-24 when it receives signals corresponding to the numbers of pulses 14–15 and 16–17 respectively. The detailed description of the second counter section 18 is omitted since it has the same construction as the first one 17. A counter and a matrix gate in the second counter section 18 are respectively represented by symbols CT-2 and MG-2 in the drawing and the same reference numerals are used to denote the same parts as those of the first counter section 17. When timing signal $T_{19}$ is sent to the AND gates AG-21 to AG-24 at timing $T_{19}$, only the AND gates AG-21 to AG-24 receiving signals $J_1$-1 to $J_4$-1 or $J_1$-2 to $J_4$-2 from both matrix gates MG-1, MG-2 send a logic "1" signal to the corresponding flip-flops FF-1 to FF-4. Only the flip-flops out of FF-1 to FF-4 receiving this logic "1" signal send signals $J_1$-3 to $J_4$-3 to collation gate 19. Further, when the respective signals from matrix gates MG-1, MG-2 are sent to different AND gates AG-21 to AG-24, none of the AND gates AG-21 to AG-24 sends a logic "1" signal to the flip-flops FF-1 to FF-4 so that none of the flip-flops FF-1 to FF-4 are set. Hence, signals $J_1$-3 to $J_4$-3 are not sent to the collation gate 19. Together with signals $J_1$-3 to $J_4$-3 from flip-flops FF-1 to FF-4, identifying signals $J_1$-4 to $J_4$-4 from photo-pattern sensors PH-1, PH-2 are sent through an amplifyer circuit 20 to the collation gate 19. When these input signals coincide with each other, i.e. when the kinds of note represented by these signals coincide with each other, the nominal value of the note is applied to the input of the arithmetic control device 13 from the collation gate 19. Also, output timing signal $T_{20}$ is applied to counters CT-1, CT-2 at timing $T_{20}$ to reset the counter CT-1, CT-2.

Next, the construction of device for detecting oblique orientation of the note will be described. When counter CT-1 does not count pulses in the first counter section 17, output signal $C_0$ from matrix gate MG-1 is sent to AND gate AG-31, and when two pulses are counted, output signal $C_2$ from matrix gate MG-1 is sent to another AND gate AG-32. In the second counter section 18, contrary to the first one 17, output signal $C_0$ from matrix gate MG-2 is applied to AND gate AG-32 when no pulse is counted, and output signal $C_2$ is delivered to AND gate AG-31 when two pulses are counted. Also, AND gates AG-31, AG-32 send output signals to OR gate OG-2 only when they receive input signals $C_0$, $C_2$ simultaneously, and this OR gate OG-2, upon receipt of input signal from either AND gate AG-31 or AG-32, sends an output signal at logic "1" to flip-flop FF-5 which is set, upon receipt of the logic input "1" signal, to send a defective note set alarm signal to, for example, an alarm device (not shown), while sending an output reset signal through OR gate OG-3 to the flip-flops FF-1 to FF-4. Also, when the note is extracted from the detecting device 2, an output reset signal is applied to flip-flop FF-5 through an inverter 21 and OR gate OG-4 while the output reset signal is further sent to flip-flops FF-1 to FF-4 through OR gate OG-3. As the power is applied and a reset button (not shown) is depressed, the output reset signal is applied to flip-flops FF-1 to FF-5 through the same signal path as the above-mentioned one.

Hereinafter, the operation of the apparatus will be described.

When customers bring goods to a cashier, the cashier enters the amount of money for each good through the key input device 11. Then the sum total of the amount of money for these goods are computed by the arithmetic control device 13.

Then the operation mode is changed over by the operation of keys to enter the amount of money received from customers. Assuming the total sum of the goods amounts to 4,150 yen and the cashier receives from a customer a 5,000 yen note together with 150 yen in coins, the apparatus operates in the manner shown below. First, the amount of received money, 150 yen, is entered through the key input device 11 by the operation of keys. Also, the 5,000 yen note is mounted on the body 2 of note identifying device, and the kind of note is identified in the note identifying device 12 by the output signal from the sensor of the note identifying device body 2 so that the amount of money of this note is delivered to the input of the arithmetic control device 13.

Next, will be detailed the operation of the bill identifying device 12. First, the power source for the register apparatus is turned ON at the beginning of business, and the output reset signal interlocked with this operation is applied to the flip-flop FF-5 and also to flip-flops FF-1 to FF-4 through OR gate OG-3. Thus, the circuit is in a reset condition to prevent malfunction when the power source is turned ON. As mentioned above, the note received from the customer is inserted between the base plate 8 and holding plate 9 of the note identifying device body 2 and the holding plate 9 is turned down toward the base plate 2 to hold the note. Such a position of the note that the side edges of the note are parallel to those of the base plate 8 or the angle formed between these edges is within an allowable range will be referred to as "the normal note orientation", whereas the position in which the angle of inclination exceeds the above-mentioned allowable range will be referred to as the "oblique note orientation", hereinafter.

Figure 6:
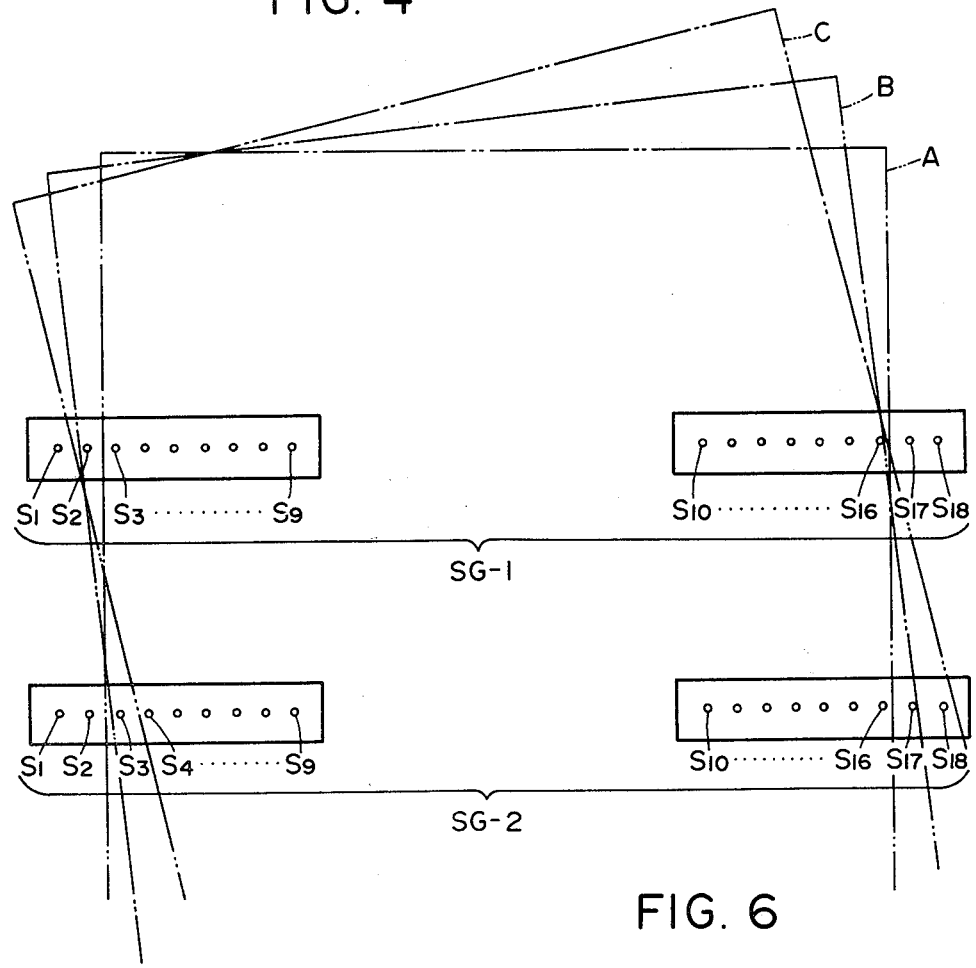
FIG. 6 is a schematic explanatory view of the orientation of note.

Referring first to the normal note orientation, when the side edges of a note are parallel to those of the base plate 8 as shown by phantom line A in FIG. 6, the opposing sensors $S_1$–$S_{18}$ of the respective sensor groups SG-1, SG-2 are concealed by the note. Namely as shown in FIG. 6, the respective 14 sensors $S_3$–$S_{16}$ among sensors $S_1$–$S_{18}$ of the respective sensor groups SG-1, SG-2 are concealed by the 5,000 yen note. Similarly 10 sensors are concealed by the 500 yen note, 12 sensors by a 1,000 yen note and 16 sensors by a 10,000 yen note. Also when the note is inclined within the allowable range as shown by phantom line B in FIG. 6, opposed sensors are concealed similarly to the case of normal orientation or sensors in the staggered positions are concealed. Namely, as shown by phantom line B in FIG. 6, sensors $S_2$–$S_{16}$ in the first sensor group SG-1 and sensors $S_3$–$S_{17}$ in the second sensor group SG-2 are concealed by the 5,000 yen note. In this case, the maximum number of sensors concealed in the respective sensor groups SG-1, SG-2 is 15. When a note is inclined within the allowable range, the increment in the sensors concealed by the note is 1 at the maximum in each sensor group SG-1, SG-2, compared with the normal orientation. Accordingly, in the case of a 500 yen note, 11 sensors at the maximum are concealed, by a 1,000 yen note the maximum is 13, and by a 10,000 yen note the maximum is 17 sensors. Further, in the inclined orientation within the allowable range, the 10,000 yen note does not protrude from the upper surface of the base plate 8 so that the cashier can sense the allowable range of inclination of note. When the note in the normal orientation is held by the holding plate 9, the timing signal outputs $T_1$–$T_{18}$ are applied to AND gates AG-1 to AG-18 of the respective counter sections 17, 18. When AND gates AG-1 to AG-18 receive the timing signal inputs and also the signal inputs from sensors $S_1$–$S_{18}$ concealed by a note, pulse signal outputs are sent through OR gate OG-1 to counters CT-1, CT-2. For example, in the case of a 5,000 yen note, 14–15 sensors are concealed by the note so that 14–15 pulses are counted by the counters CT-1, CT-2. The respective matrix gates MG-1, MG-2 receiving signals from the counters CT-1, CT-2 send signals $J_3$-1, $J_3$-2 to AND gates AG-23 which in turn sends a logic "1" signal output to flip-flop FF-3 upon receipt of timing signal $T_{19}$ at timing $T_{19}$ so that the flip-flop FF-3 is set to send signal $J_3$-3 output to the collation gate 19. Also, identifying signal $J_3$-4 is applied to the input of the collation gate 19 from photosensors PH-1, PH-2. The collation gate 19, receiving both signals, sends the nominal value of the note to the input of the arithmetic control device 13. Further, in the case of a 500 yen note, counters CT-1, CT-2 count the number of pulse 10–11 and send identifying signal $J_1$-3 through matrix gates MG-1, MG-2, AND gate AG-21 and flip-flop FF-1 to the collation gate 19. Similarly in the case of 1,000 yen and 10,000 yen notes, the counters count the number of pulses 12–13 and 16–17 respectively to send signals $J_2$-3 and $J_4$-3 to the collation gate 19.

Next, the condition under which a note is oriented obliquely as shown by phantom line C in FIG. 6 will be described. In this case the respective sensors $S_1$–$S_{18}$ concealed by the note of sensor groups SG-1, SG-2 are staggered by 2 sensors from the position in which they are opposed to each other. Namely in the case of a 5,000 yen note, sensors $S_2$–$S_{16}$ of the first sensor group SG-1 are concealed and sensors $S_4$–$S_{18}$ of the second sensor group SG-2 are concealed as shown in FIG. 6. In such an oblique note orientation, the number of sensors concealed may be increased by more than 2 compared with the normal note orientation so that the kind of money may be entered erroneously. However, the oblique note position is checked by the note identifying device 12. This checking function will be described with reference to the note orientation shown by phantom line C in FIG. 6. Namely, sensor $S_1$ of one sensor group SG-1 is not concealed by the note so that sensor signal $S_1$ is not applied to the input of AND gate AG-1 and therefore, pulse signal is not generated from the output of the AND gate AG-1 at timing $T_1$. Thus signal $C_0$ is sent from matrix gate MG-1 in the first counter section 17 to AND gate AG-31. Also sensor $S_2$ of sensor group SG-1 are concealed by the note and a pulse signal is generated from AND gate AG-2 at timing $T_2$. Then, a pulse signal is generated from AND gate AG-3 at timing $T_3$ and the counter CT-1 counts the number of pulses 2 at this timing $T_3$. At that time, signal $C_0$ is not sent from matrix gate MG-1 to AND gate AG-1 31, but signal $C_2$ is generated. On the other hand, sensors $S_1$–$S_3$ are not concealed in the second sensor group SG-2 so that counter CT-2 does not count pulses until timing $T_3$, whereby matrix gate MG-2 sends signal $C_0$ to AND gate AG-31 at timing $T_3$. Thus, AND gate AG-31, upon receipt of signals $C_0$, $C_2$ generates a logic "1" signal which is applied to the flip-flop FF-5 through OR gate OG-2. Then the flip-flop FF-5 sends a defective note set alarm signal to the alarm device which in turn produces an audible alarm to inform the cashier of the oblique note orientation beyond the allowable range of inclination. Also, flip-flop FF-5 sends a reset signal through OR gate OG-3 to flip-flops FF-1 to FF-4 so that flip-flops FF-1 to FF-4 are reset and do not send an identifying signal to the collation gate 19. Further in the case of oblique note orientation in the opposite direction to that shown by phantom line C in FIG. 6, signal $C_2$ is sent from matrix gate MG-2 to AND gate AG-32 and signal $C_0$ is sent from matrix gate MG-1 to the same AND gate AG-32. The AND gate AG-32, upon receipt of these signals $C_0$, $C_2$, sends a logic "1" signal to flip-flop FF-5 through OR gate OG-2. The subsequent operation is similar to the above-mentioned one. As mentioned before, as the cashier who is informed of the oblique note position by the audible alarm extracts the note from the note identifying device body 2, all flip-flops FF-1 to FF-5 are reset through the inverter 21 and the OR gates OG-4, OG-3. Then, if the note is again placed on the base plate 8 in the correct position to be held by the holding plate 9, a new cycle of operation for the above-mentioned identification is started. The note may be rearranged to the normal note orientation without being drawn out of the note identifying device body 2. In such a case, however, the flip-flops FF-1 to FF-5 are not reset. Therefore, a reset button is depressed to generate a reset signal for resetting these flip-flops FF-1 to FF-5 so that the note identifying device 12 starts the identifying operation. When the identification is completed in the normal note orientation, the note is drawn out to reset the circuit for the next customer.

When the nominal value of note is entered into the arithmetic control device 13 from the note identifying device 12 in the above-mentioned manner, the arithmetic control device 13 adds up the amount of received money entered through the key input device 11, for example 150 yen, and the nominal value of the note, for example 5,000 yen, to arithmetically compare the total amount of received money, 5,150 yen with the total amount of money for commodity memorized in the memory device 16, i.e., 4,150 yen, and compute the amount of change, i.e., 1,000 yen. Also, the display device 7 displays according to the arithmetic operation of the arithmetic control device 13 the amount of money for a commodity and the amount of money received entered through the input key device 11, the amount of received money entered from the note identifying device 13, the respective total amounts of money for a commodity and received money and, further, the change. Also, the journal printer 15 prints the amount of money to be displayed on the display device 7, in accordance with the result of arithmetic operation of the arithmetic control device 13.

By identifying a note with the note identifying device 12 in this manner, cashier error, for example taking a 5,000 yen note for a 10,000 yen one, can be eliminated to prevent troubles with a customer and losses due to the over payment of change.

While, in said embodiment, the note identifying body 2 is provided with photopattern sensors PH-1, PH-2 for identifying the kind of money according to the light and shade of note, they may be omitted if it is desired to simplify the construction of the apparatus. In such a case, the amplifyer circuit 20 and collation gate 19 shown in FIG. 5 are eliminated.

While all notes are identified by the note identifying device in the described embodiment, it is possible to arrange it such that the note of comparatively small, e.g. 500 yen or 1,000 yen note, is entered by key operation rather than by identifying device.

Figure 7:
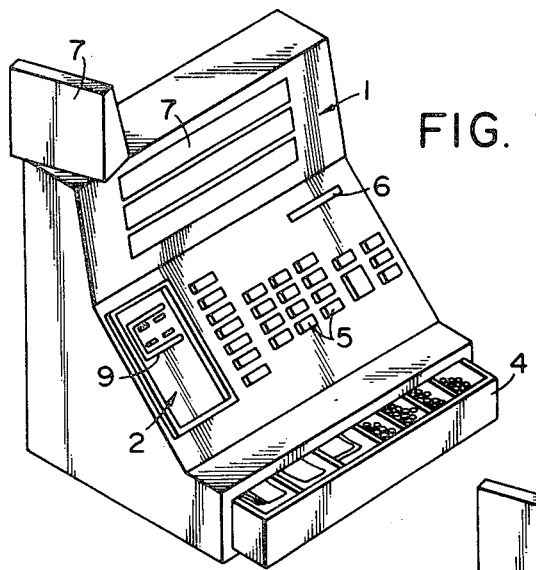
FIG. 7 is a perspective view of register apparatus constructed in accordance with a second embodiment of this invention.

Also while the note identifying device body 2 is constituted separately from the register device body 1 in said first embodiment, the note identifying device body 2 may be incorporated into the register apparatus body 1 like the second embodiment shown in FIG. 7. Since the rest of the construction is similar to that of the first embodiment, the description thereof is omitted, and the same reference numerals are used to designate the same parts in the drawing. Also, while the note placed on the register apparatus body is held by the holding plate 9 in the first and second embodiments, the note may be held by other means such as a magnet instead of the holding plate 9.

Figure 8:
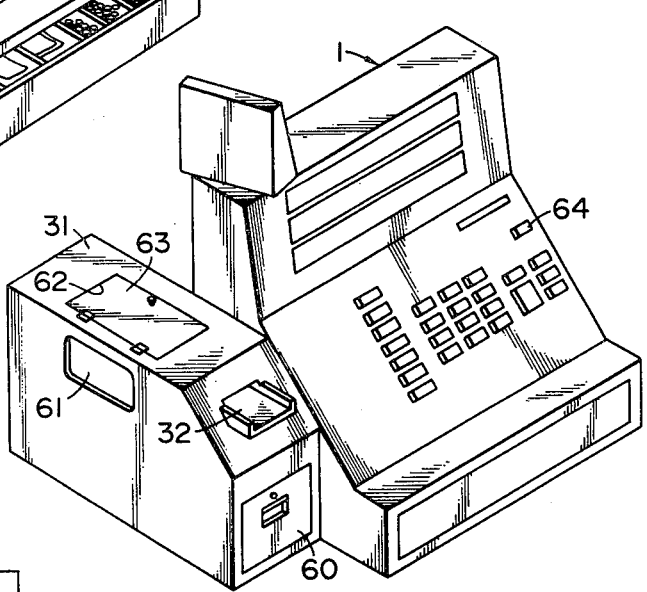
FIG. 8 is a perspective view of a third embodiment of the register apparatus.
Figure 9:
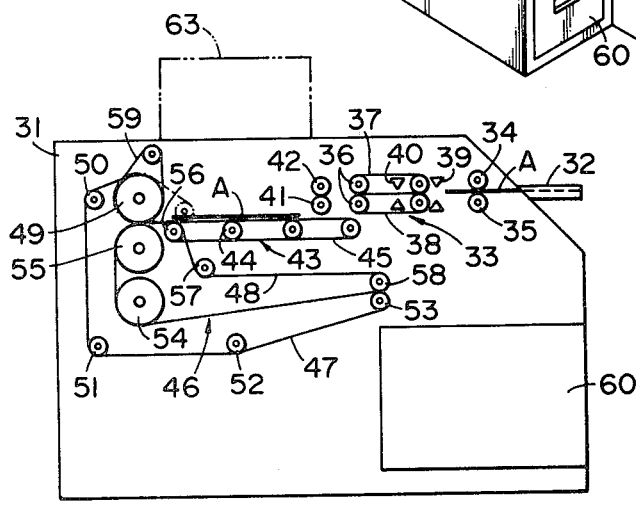
FIG. 9 is a schematic sectional view of the note identifying device body of the third embodiment.
Figure 10:
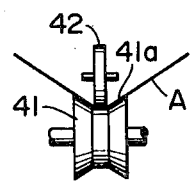
FIG. 10 is a front view of feed-out rollers of the third embodiment.

FIGS. 8 to 10 shows a third embodiment of the invention. The note identifying device body designated by a numeral 31 is constructed as follows: The device body 31 is provided at the upper front portion thereof with a note inserting port 32 which communicates with a first carrier path 33. In this first carrier path 33, a note A inserted from the inserting port is taken in by a pair of rollers 34, 35 to be sandwiched between the upper and lower belts 37, 38 rotated by rollers 30 . . . and fed into the interior. This first carrier path 33 is provided with sensors 39, 40 which detect, for example, the optical pattern of the note A to identify the kind of note. Then the note A is finally fed out of feed-out rollers 41, 42 to a temporary storing section 43. This lower feed-out roller 41 has a groove 41a with a gentle incline as shown in FIG. 10, and the upper feed-out roller 42 engages with this groove 41a. Thus the note A sandwiched between these feed-out rollers 41, 42 is folded into a V-shape and is never folded perpendicularly to the direction of the carrier path to prevent defective delivery due to the suspended leading end and ensures a correct delivery to the temporary storing section 43. The temporary storing section 43 is constructed to have a plurality of rollers 44 . . . trained over by a belt 45. The second carrier path 46 communicates with this temporary storing section 43. This second carrier path 46 is formed between two belts 47, 48. The first belt 47 runs over rollers 49, 50, 51, 52, 53, 54 and 55 and the second belt 48 runs over rollers 54, 55, 56, 57 and 58. The note A placed on the temporary storing section 43 is fed in the second carrier path 46 by turning down a feed-in belt 59 to the position shown by the broken line and sent from this carrier path 46 to a note receiving box 60. Further, a pair of rollers 53, 58 disposed at the terminal end of the second carrier path 46 have the same configuration as the feed-out rollers 41, 42 so that the note A can be positively fed to the note receiving box 60 without being folded. This note receiving box 60 is designed to be drawn out of the lower front part of the note identifying device body 31. Also, note identifying device body 31 is provided at its one side with a window 61 through which the note placed on the temporary storing section 43 can be confirmed visually. Also, the device body 31 is provided at its upper surface with a note delivery port 62 which is adapted to be opened and closed by a lid 63. Sensors 39, 40 indentify the kind of note to enter the nominal value to the arithmetic control device. Also when a customer has a claim concerning the kind of money, a release instruction button 64 provided on the register apparatus body 1 is depressed. Then the lid 63 is unlocked and opened so that the note can be drawn out through the note delivery port 62. Simultaneously, a signal is sent to the memory device and the memory of the amount of money for this note is reset. After the completion of exact calculation for the customer, the feed-in belt 59 is turned down by the button operation to send the note A from the second carrier path 46 to the note receiving box 60.

The note identifying device according to this invention is not limited to those of the described embodiments, and it is possible to use any known note identifying device.

As will be apparent from the foregoing description, according to this invention, the kind of note is identified by the note identifying device and then entered into the arithmetic control device. Accordingly, an error concerning the kind of note can be avoided when the cashier enters the amount of received money through key operation. Consequently, troubles with customers can be prevented while losses due to the payment of superfluous change can be prevented.

What is claimed is:
1. A register apparatus, comprising:
key input means for successively entering commodity prices and the amount of money received from a customer by a keying operation;
note identifying means for identifying the denomination of a note to be identified as received from the customer;
arithmetic control means for adding said commodity prices and calculating the sum of said amount of money entered through said key input means and the amount of money identified by said note identifying means, said arithmetic control means comparing the sum of said commodity prices and said sum of money with each other to calculate the amount of change;

display means for displaying said sum of said commodity price, said sum of money received from the customer and said amount of said change; and memory means for memorizing said sum of said commodity price, said sum of money received from the customer and said amount of said change;

wherein said identifying means comprises a rectangular base plate for supporting the note to be identified, a first group of photo-electric sensors disposed on the base plate for generating first signals when blocked from light by the note, a second group of photo-electric sensors disposed on the base plate in opposition to said first group for generating second signals when blocked from light by the note, a light source disposed above the base plate for projecting light onto said first and second groups of photo-electric sensors, first note width detecting means for receiving said first signals and generating a third signal representing the width of the note, second note width detecting means for receiving said second signals and generating a fourth signal representing the width of the note, receiving means for receiving said third and fourth signals and responsive thereto for determining the kind of the note, and further detecting means for detecting the quantity of oblique orientation of the note in response to said first and second signals and for generating a fifth signal when the quantity of oblique orientation of the note exceeds a predetermined value.

2. A register apparatus as set forth in claim 1, wherein said first group of photo-electric sensors comprises two sub-groups of sensors disposed in a row in alignment with but spaced from each other, and wherein said second group of photo-electric sensors comprises two sub-groups of sensors disposed in a row in alignment with but spaced from each other, each sub-group of said first group of photo-electric sensors being disposed opposite to each sub-group of said second group of photo-electric sensors.

3. A register apparatus as set forth in claim 1, further including alarm means for issuing an alarm in response to said fifth signal from said further detecting means.

4. A register apparatus as set forth in claim 1, wherein said note identifying means further includes a device for detecting the pattern of the note.

* * * * *